United States Patent
Palmer

(10) Patent No.: US 11,150,814 B2
(45) Date of Patent: Oct. 19, 2021

(54) UTILIZING A LINK INTERFACE FOR PERFORMING PARTIAL WRITE OPERATIONS TO MEMORY

(71) Applicant: International Business Machines Corporation, Armonk, NY (US)

(72) Inventor: Michael John Palmer, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/665,432

(22) Filed: Oct. 28, 2019

(65) Prior Publication Data

US 2021/0124501 A1 Apr. 29, 2021

(51) Int. Cl.
| | |
|---|---|
| *G06F 13/00* | (2006.01) |
| *G06F 3/06* | (2006.01) |
| *G06F 9/30* | (2018.01) |
| *G06F 11/10* | (2006.01) |

(52) U.S. Cl.
CPC ............ *G06F 3/0619* (2013.01); *G06F 3/064* (2013.01); *G06F 3/0656* (2013.01); *G06F 3/0679* (2013.01); *G06F 9/30029* (2013.01); *G06F 11/1008* (2013.01)

(58) Field of Classification Search
CPC .. G06F 3/0619; G06F 9/30029; G06F 3/0656; G06F 3/0679; G06F 11/1008; G06F 3/064
See application file for complete search history.

(56) References Cited

U.S. PATENT DOCUMENTS

| | | | | |
|---|---|---|---|---|
| 6,510,537 | B1 * | 1/2003 | Lee ...................... | G06F 11/1008 |
| | | | | 714/763 |
| 10,846,168 | B1 * | 11/2020 | Kadowaki ........... | G06F 11/1048 |
| 10,868,570 | B2 * | 12/2020 | Cha .................... | H03M 13/2906 |
| 2007/0220401 | A1 * | 9/2007 | Bains .................. | G11C 7/1045 |
| | | | | 714/766 |
| 2015/0331742 | A1 * | 11/2015 | Liang .................... | G11C 29/52 |
| | | | | 714/764 |
| 2016/0092307 | A1 * | 3/2016 | Bonen ................. | G06F 11/1076 |
| | | | | 714/764 |
| 2017/0177436 | A1 * | 6/2017 | Lee .................... | H03M 13/2906 |
| 2018/0189133 | A1 * | 7/2018 | Prathapan ............... | G11C 5/04 |
| 2018/0314586 | A1 | 11/2018 | Artieri | |
| 2019/0042359 | A1 | 2/2019 | Durham | |
| 2019/0095279 | A1 | 3/2019 | Gaikwad | |
| 2019/0095363 | A1 * | 3/2019 | Agarwal ............. | G06F 13/1668 |
| 2019/0146870 | A1 * | 5/2019 | Cha ...................... | G06F 11/1068 |
| | | | | 714/755 |

FOREIGN PATENT DOCUMENTS

| | | | |
|---|---|---|---|
| JP | 2020161074 A | * | 10/2020 |
| KR | 1020200122448 A | * | 10/2020 |

* cited by examiner

*Primary Examiner* — Jing-Yih Shyu
(74) *Attorney, Agent, or Firm* — Stephen R. Yoder

(57) ABSTRACT

There is a method and a corresponding system for performing partial write operations to memory. This method and corresponding system utilizes an XOR operation to generate error checking bits. Once the error checking bits are generated, they are then used for error checking a set of data bits so that these data bits can be written to memory.

14 Claims, 4 Drawing Sheets

UTILIZING A LINK INTERFACE FOR PERFORMING PARTIAL WRITE OPERATIONS TO MEMORY

BACKGROUND

The present invention relates generally to the field of writing data to memory, and in particular to a method for a partial write operation to memory.

Link interfaces are known. Link interfaces typically support data transfer between a host processor and a device. In certain instances, such interface adheres to a communication protocol that provides a standard for data transfer and supports control and response packets to be passed between the host processor and a device. An example of such a communication protocol is OpenCAPI. OpenCAPI is a data transfer standard that allows control and response packets to be passed between a host processor and an OpenCAPI device (such as DDR4 DRAM which is physically arranged in 64-byte blocks of data for example).

SUMMARY

The present invention provides a method for a partial write operation to memory. Such a method may be computer-implemented.

The present invention further provides a computer program product including computer program code for implementing a proposed method when executed by a processing unit. The present invention also seeks to provide a processing system adapted to execute this computer program code.

The present invention also provides a link interface for facilitating a partial write operation to memory.

The present invention also provides a processor comprising a proposed link interface, and a device comprising a proposed link interface.

According to another aspect of the invention, there is provided a method for a partial write operation to memory. The method comprises selecting, from a source of data bits having an associated first set of error checking bits, a first set of data bits for writing to the memory. The method also comprises selecting, from the source of data bits, a second set of data bits not for writing to the memory. Based on the second set of data bits, a second set of error checking bits is determined. The first and second sets of error checking bits are then provided as inputs to an XOR operation to generate a third set of error checking bits. The method then comprises error checking the first set of data bits based on the third set of error checking bits.

According to another aspect of the invention, there is provided a computer program product. The computer program product comprises a computer readable storage medium having program instructions embodied therewith, the program instructions executable by a processing unit to cause the processing unit to perform a method according to a proposed embodiment.

According to another aspect of the invention, there is provided a computer system comprising at least one processor and the computer program product according to an embodiment. The at least one processor is adapted to execute the computer program code of said computer program product.

According to yet another aspect of the invention, there is provided a link interface for facilitating a partial write operation to memory. The link interface comprises a first data selection component configured to select, from a source of data bits having an associated first set of error checking bits, a first set of data bits for writing to the memory. The link interface also comprises a second data selection component configured to select, from the source of data bits, a second set of data bits not for writing to the memory. The link interface further comprises an error code generator configured to determine, based on the second set of data bits, a second set of error checking bits. The link interface yet further comprises an XOR component configured to execute an XOR operation with the first and second sets of error checking bits as inputs to generate a third set of error checking bits. An error checking component of the link interface is configured to error check the first set of data bits based on the third set of error checking bits.

BRIEF DESCRIPTION OF THE DRAWINGS

Embodiments of the present invention will now be described, by way of example only, with reference to the following drawings, in which.

DETAILED DESCRIPTION

Figure 1:
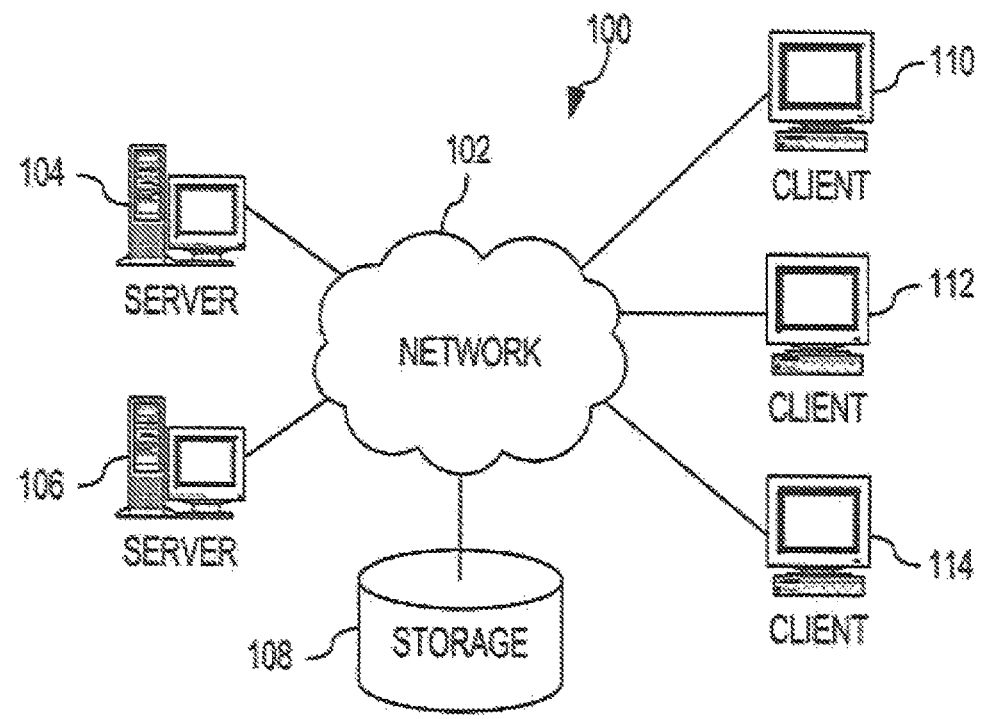
FIG. 1 is a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a computer system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

This document discusses in detail a method for partial write operations to memory. In some embodiments, this method enables integrity checking of a byte-steering dataflow with multi-byte ECC checking. Thus, unlike conventional partial-write operation approaches (which are unable to use ECC bits to check merging logic properly), embodiments of the present invention enables checking of single bits that are steered through merging logic of a link interface.

In particular, typical ECCs (e.g. SEC-DED codes) are linear, i.e. ecc(A+B)=ecc(A)+ecc(B), wherein "+" is a bitwise XOR operator. With the example of a typically ECC, if the merging logic is working correctly, the ECC bits from the XOR operation will match the ECC computed over the data bits being sent to the memory. Accordingly, embodiments of the present invention are therefore configured to XOR unused data bits with the stored ECC bits (e.g. the data bits from the partial write operation and the data bits read from memory, which are typically held in on-chip arrays).

For example, as well as selecting a required 64 bytes from 128 bytes held in two on-chip arrays, and then feeding these down a dataflow to the target memory (e.g. DRAM), proposed embodiments are configured to separately select the remaining 64 "unused" bytes that are not fed to the target memory. An ECC is then computed from these "unused" bytes, and XORed with the ECC bytes from the two arrays. This may be done for each 8-byte chunk that an ECC code operates over, i.e. eight times overall for a 64-byte data block. The ECC bytes from this XOR process, if the logic is working correctly, will then match ECC computed over the 64-bytes being sent to the target memory. This can be integrity checked by logic at the point where the data bytes are delivered to the memory. A fault in any part of the logic in either the "to memory" or "unused" data byte paths (or the ECC paths) will result in the integrity check failing.

Embodiments of the present invention are directed to a concept of employing the un-used data bits of a partial write operation (i.e. the data bits not for writing to the memory) in order to check the integrity of the data merging logic. In this way, embodiments may enable checking of single bits that are steered through merging logic of a link interface.

In particular, embodiments of the present invention compute ECCs from the un-used bits, and then XOR these with the ECC computed for the data bits being sent to the memory. Simple XOR operation(s) can thus be employed for integrity checking. Put another way, embodiments of the present invention employ an XOR operation to generate error checking bits that can then be used for error checking of data bits for writing to the memory.

Embodiments of the present invention includes selecting, from a source of data bits, a first set of data bits for writing to the memory, the source of data bits having an associated first set of error checking bits. Such embodiments may then further include selecting, from the source of data bits, a second set of data bits not for writing to the memory. Based on the second set of data bits, a second set of error checking bits is determined. The first and second sets of error checking bits are then provided as inputs to an XOR operation which generates a third set of error checking bits (by 'XORing' the inputs, namely the first and second sets of error checking bits). The integrity of the partial-write operation is then checked by error checking the first set of data bits based on the third set of error checking bits.

In some embodiments, the source of data bits may be stored in at least one data storage buffer. For example, a first set of source data bits associated with a partial write operation may be stored in a first data storage buffer, and a second set of source data bits from the memory may be stored in a second data storage buffer. In this way, conventional on-chip data storage buffers may employed for the source of data bits.

By way of example, the source of data bits may comprise a plurality of data storage units each configured to store a respective collection of data bits. Selecting a first set of data bits for writing to the memory may then comprise using a multiplexer to select the first set of data bits from the collections of data bits stored by the plurality of data storage units. Similarly, selecting a second set of data bits not for writing to the memory may comprise using a multiplexer to select the second set of data bits from the collections of data bits stored by the plurality of data storage units. A relatively simple and low-cost multiplexer arrangement may therefore be employed by embodiments to select the appropriate data bits for a partial-write operation according to an embodiment.

Determining a second set of error checking bits may comprise computing an error checking code based on the second set of data bits. By way of example, for each set of bits, error checking bits may be computed using an XOR-based ECC algorithm. In particular, the algorithm may be based on a Hamming code (well known in the industry). However, it is to be understood that any other code could be used just as well, provided each error checking bit is calculated using an XOR operation across a subset of the data bits. In this regard, the same ECC algorithm is to be used in each step. For instance, the ECC algorithm used for the error checking bits associated with the source of data bits should match that used to calculate the second set of error checking bits based on the second (i.e. "unused") set of bits, and should also match that used the final integrity check.

The partial write operation may comprise an OpenCAPI protocol partial write operation. The first set of data bits may thus comprise a subset of a 64-byte block data Flit. Accordingly, proposed embodiments may provide compliance and full flexibility with the OpenCAPI specification with regard to handling partial-write operations.

When processing a "partial write" operation (e.g. pr_wr_mem or mem_wr.be commands), a Data Flow Control Digit (Flit) is typically received via OpenCAPI, and a subset of the data bytes is used as new data to be written into memory at corresponding offsets. The remaining bytes in memory are required to remain unchanged, which is done by reading the memory block and rewriting those bytes back to memory at the same time as the new data bytes are written.

Both the data bytes from the partial write operation and bytes read from memory are held in on-chip arrays, and these arrays are protected by Error Checking Codes (ECC), so that transient errors within the on-chip arrays can be corrected. A single-error-correction, double-error-detection (SEC-DED) code is typically used, adding one byte of ECC to each eight bytes of data.

It is preferable to check correct operation of the dataflow all the way from the arrays through to when it is delivered to the memory, to avoid undetected corruption of customer data. Where an ECC is present, this ECC can be checked for consistency with the corresponding data. However, the ECC scheme covers blocks of eight bytes, and single bytes get steered through the merging logic, so conventional use of the ECCs does not check the merging logic properly.

FIG. 1 depicts a pictorial representation of an exemplary distributed system in which aspects of the illustrative embodiments may be implemented. A distributed system 100 includes a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
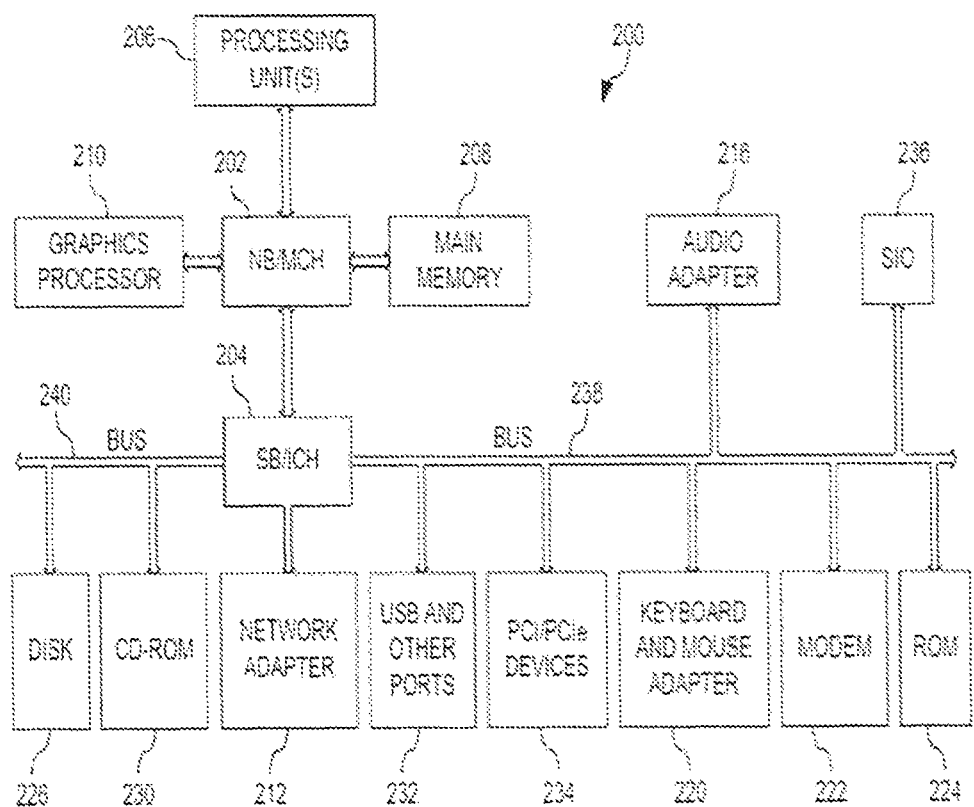
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for enabling checking of data flow of a partial-write request. Such embodiments employ the linear XOR operation to check ECC generated for un-used data bits. A fault in any part of the logic in either the "to memory" or "unused" data bit paths (or the ECC paths) may therefore be identified using the proposed concept(s).

By way of further explanation, a proposed embodiment will now be described with reference to a link interface employing the OpenCAPI protocol.

Figure 3:
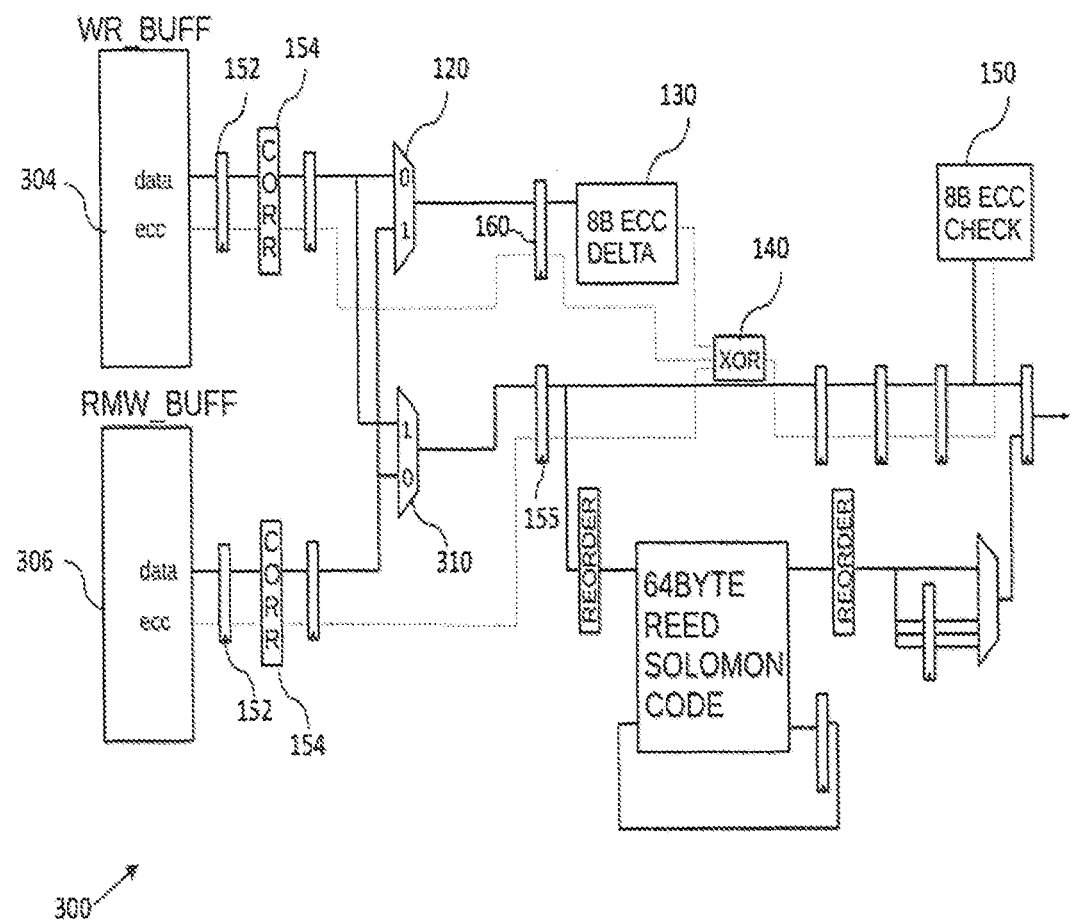
FIG. 3 is a schematic diagram of a link interface according to an embodiment of the present invention.

Referring now to FIG. 3, there is depicted a schematic diagram of a link interface 300 according to an embodiment. Here, the interface comprises: first 304 and second 306 data storage buffers; first 310 and second 120 data selection components; an error code generator 130; an XOR component 140; and an error checking component 150.

The 64 bytes supplied by a host over OpenCAPI are held in the first storage buffer 304 ("WR_BUFF"). For each 8 bytes, an additional ECC of 1 byte is also stored in the same first storage buffer 304 ("WR_BUFF").

The 64 bytes read from memory are stored in the second storage buffer 306 ("RMW_BUFF"), also with one additional ECC byte for each 8 bytes of data.

The buffer outputs (data and ecc) are first latched 152, and then passed through ECC correction 154 (to correct any single bit errors in the data or ECC which may have occurred in the storage buffers). The corrected data then goes to the first 310 and second 120 data selection components (which in this example each includes its own multiplexer—not shown separately in FIG. 3).

The 64 bytes which need to go to DRAM are selected using the first multiplexer of the first data selection component 310. These bytes, together with the ECC information from first storage buffer 304 WR_BUFF, are fed into a "merged_q" register 155.

The 64 bytes which do not need to go to DRAM (i.e. the un-used bytes) are selected using the second multiplexer of the second data component 120. These bytes, together with the ECC information from the second storage buffer 306 RMW_BUFF, are fed into an "un-used_q" register 160. Here, it is noted that the ECC from each buffer bypasses the selection, and is fed unchanged through registers 155 and 160, to the XOR component 140.

"At the output of the "unused_q" register 160, the error code generator 130 computes ECC over the data portion. The output of the error code generator 130 is then provided to the XOR component 140 so as to be 'XORed' with the ECC part of "unused_q" and the ECC part of "merged_q". Thus, by way of further explanation, the ECC stored in the "merged_q" register 155 does not match the "used" data stored in the merged_q register 155. Similarly, the ECC stored in the "un-used_q" register 160 does not match the "unused" data stored in the un-used_q register 160. These two ECCs remain what came from the first 304 and second 306 storage buffers, and they are XOR'ed together (by the XOR component 140 to give the overall ECC of the source of bytes across both buffers 304 and 306. That is then XOR'ed (by the XOR component 140) with the calculated ECC on the "unused" bytes."

The resulting ECC generated by the XOR component 140 then proceeds down the dataflow, with the corresponding data from the "merged_q" register 155. At the end of the dataflow, the ECC is checked against the corresponding data, and an "integrity error" raised if it does not match. In this example, the SEC-DED ECC code used can detect up to 3 bits in error.

Figure 4:
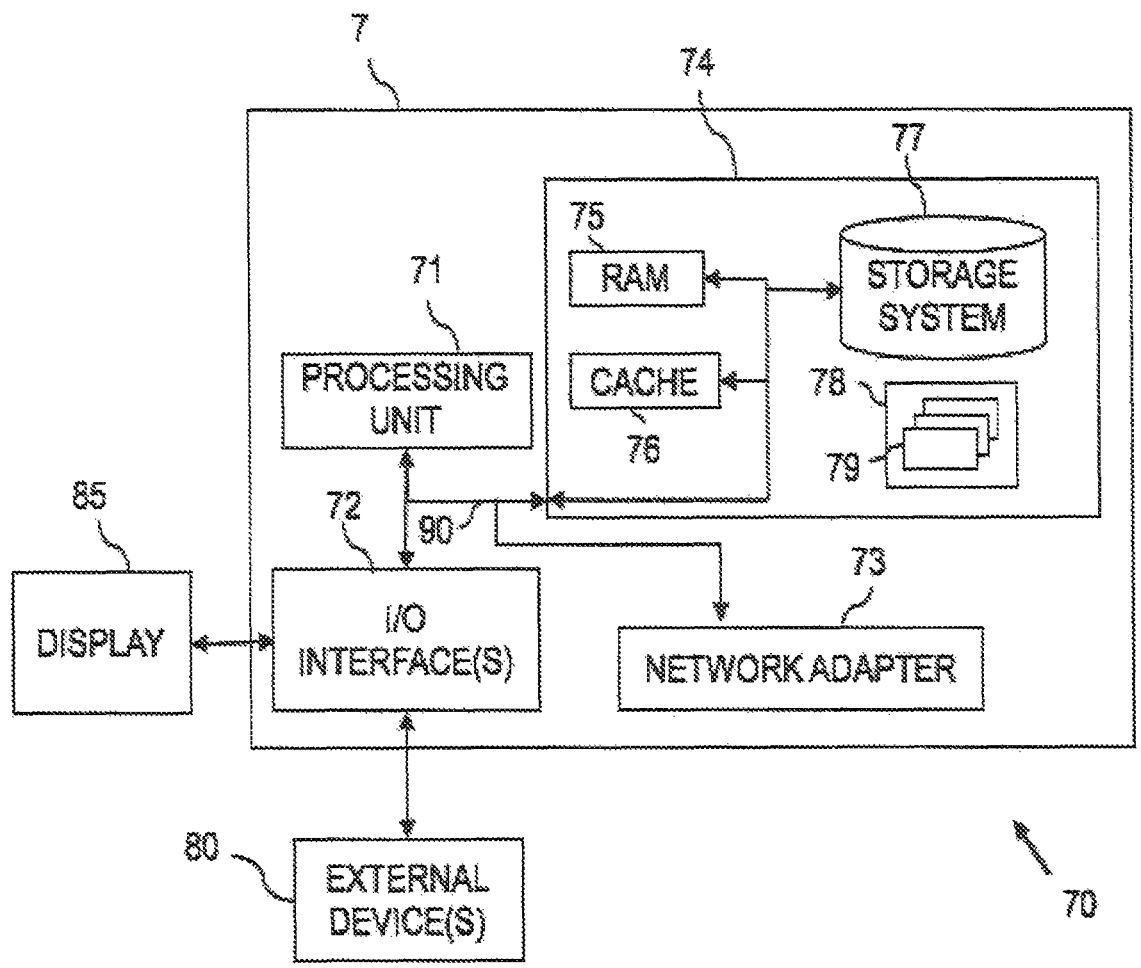
FIG. 4 is a block diagram view of a computer system according to an embodiment of the present invention.

Referring now to FIG. 4, there is depicted a block diagram view of a computer system 70 according to an embodiment of the present invention. Embodiments of the computer system 70, which may form part of a networked system 7 illustrated in FIG. 4. For instance, a link interface according to an embodiment may be implemented in the computer system 70 (e.g. as an I/O interface 72). The components of computer system/server 70 may include, but are not limited to, one or more processing arrangements, for example comprising processors or processing units 71, a system memory 74, a storage system 77, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for according to a proposed embodiment. Program/utility 78, having a set (at least one) of program modules 79, may be stored in memory 74. Program modules 79 generally carry out the functions and/or methodologies of proposed embodiments for partial write operations to memory.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined query intent to a QA system or user).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Definitions for certain terms will be provided below:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A method for a partial write operation to memory, the method comprising:
selecting, from a source of data bits having an associated first set of error checking bits, a first set of data bits for writing to the memory;
selecting, from the source of data bits, a second set of data bits not for writing to the memory;
determining, based on the second set of data bits, a second set of error checking bits;
providing the first and second sets of error checking bits as inputs to an XOR operation to generate a third set of error checking bits;
error checking the first set of data bits based on the third set of error checking bits; and
storing, in at least one data storage buffer, the source of data bits, with the storage of the source of data bits including:
storing, in a first data storage buffer, the first set of data bits associated with the partial write operation, and
storing, in a second data storage buffer, the second set of data bits from the memory.

2. The method of claim 1, wherein the source of data bits includes a plurality of data storage units each configured to store a respective collection of data bits, and wherein selecting a first set of data bits for writing to the memory includes:
using a multiplexer to select the first set of data bits from the collections of data bits stored by the plurality of data storage units.

3. The method of claim 1, wherein the source of data bits includes a plurality of data storage units each configured to store a respective collection of data bits, and wherein selecting a second set of data bits not for writing to the memory includes:
using a multiplexer to select the second set of data bits from the collections of data bits stored by the plurality of data storage units.

4. The method of claim 1, wherein determining a second set of error checking bits further includes:
computing an error checking code based on the second set of data bits.

5. The method of claim 1, wherein the partial write operation includes an OpenCAPI protocol partial write operation, and wherein the first set of data bits includes a subset of a 64 byte block data Flit.

6. A computer program product comprising:
a machine readable storage device; and
computer code stored on the machine readable storage device, with the computer code including instructions and data for causing a processor(s) set to perform operations including the following:
selecting, from a source of data bits having an associated first set of error checking bits, a first set of data bits for writing to the memory,
selecting, from the source of data bits, a second set of data bits not for writing to the memory,
determining, based on the second set of data bits, a second set of error checking bits,
providing the first and second sets of error checking bits as inputs to an XOR operation to generate a third set of error checking bits,
error checking the first set of data bits based on the third set of error checking bits, and
storing, in at least one data storage buffer, the source of data bits, with the storage of the source of data bits including:
storing, in a first data storage buffer, the first set of data bits associated with the partial write operation, and
storing, in a second data storage buffer, the second set of data bits from the memory.

7. The computer program product of claim 6, wherein the source of data bits includes a plurality of data storage units each configured to store a respective collection of data bits, and wherein selecting a first set of data bits for writing to the memory includes:
using a multiplexer to select the first set of data bits from the collections of data bits stored by the plurality of data storage units.

8. The computer program product of claim 6, wherein the source of data bits includes a plurality of data storage units each configured to store a respective collection of data bits, and wherein selecting a second set of data bits not for writing to the memory includes:
using a multiplexer to select the second set of data bits from the collections of data bits stored by the plurality of data storage units.

9. The computer program product of claim 6, wherein determining a second set of error checking bits further includes:
computing an error checking code based on the second set of data bits.

10. The method of claim 1, wherein the partial write operation includes an OpenCAPI protocol partial write operation, and wherein the first set of data bits includes a subset of a 64 byte block data Flit.

11. A link interface for facilitating a partial write operation to memory, the link interface comprising:
a first data selection component configured to select, from a source of data bits having an associated first set of error checking bits, a first set of data bits for writing to the memory;
a second data selection component configured to select, from the source of data bits, a second set of data bits not for writing to the memory;
an error code generator configured to determine, based on the second set of data bits, a second set of error checking bits;
an XOR component configured to execute an XOR operation with the first and second sets of error checking bits as inputs to generate a third set of error checking bits;
an error checking component configured to error check the first set of data bits based on the third set of error checking bits, and
a data storage component configured to store, in at least one data storage buffer, a source of data bits, with the data storage component further including:
a first data storage buffer configured to store a first set of source data bits associated with a partial write operation; and
a second data storage buffer configured to store a second set of source data bits from the memory.

12. The link interface of claim 11, wherein the source of data bits includes a plurality of data storage units each configured to store a respective collection of data bits, and wherein the first data selection component includes:
a first multiplexer configured to select the first set of data bits from the collections of data bits stored by the plurality of data storage units.

13. The link interface of claim 11, wherein the source of data bits includes a plurality of data storage units each configured to store a respective collection of data bits, and wherein the second data selection component includes:

a second multiplexer configured to select the second set of data bits from the collections of data bits stored by the plurality of data storage units.

14. The link interface of claim 11, wherein the error code generator is configured to compute an error checking code based on the second set of data bits.

* * * * *